(12) United States Patent
Avula

(10) Patent No.: US 9,191,805 B2
(45) Date of Patent: Nov. 17, 2015

(54) CONNECTING DEVICES TO A POLICY CHARGING RULES FUNCTION DEVICE

(71) Applicant: Verizon Patent and Licensing Inc., Basking Ridge, NJ (US)

(72) Inventor: Niranjan B. Avula, Frisco, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 428 days.

(21) Appl. No.: 13/625,002

(22) Filed: Sep. 24, 2012

(65) Prior Publication Data

US 2014/0087728 A1   Mar. 27, 2014

(51) Int. Cl.
*H04W 8/18* (2009.01)
*H04L 12/24* (2006.01)

(52) U.S. Cl.
CPC *H04W 8/18* (2013.01); *H04L 41/00* (2013.01)

(58) Field of Classification Search
CPC . H04W 12/08; H04W 8/005; H04W 28/0289; H04W 28/06; H04W 80/04; H04W 28/0268; H04W 28/24
USPC .......... 455/452.2, 445, 411, 428; 379/114.16, 379/114.2; 705/39, 52, 54, 112
See application file for complete search history.

(56) References Cited

U.S. PATENT DOCUMENTS

| | | | |
|---|---|---|---|
| 7,961,714 B1* | 6/2011 | Watson et al. | 370/352 |
| 2005/0122945 A1* | 6/2005 | Hurtta | 370/338 |
| 2007/0157288 A1* | 7/2007 | Lim | 726/1 |
| 2007/0281699 A1* | 12/2007 | Rasanen | 455/436 |
| 2008/0186925 A1* | 8/2008 | Cheng et al. | 370/338 |
| 2010/0216405 A1* | 8/2010 | Bhadra et al. | 455/63.1 |
| 2012/0155389 A1* | 6/2012 | McNamee et al. | 370/328 |

* cited by examiner

*Primary Examiner* — Brandon Miller
*Assistant Examiner* — Joseph Dean, Jr.

(57) ABSTRACT

A first network device is configured to receive a first message from a user device, the first message including an identifier for the user device and a type of information being requested by the user device, and determine a level of quality of service to be applied by a network, based on the type of information being requested by the user device. The first network is further configured to receive a second message from a second network device, the second message including an identifier for a third network device. The first network device is further configured to determine the policy device connected to the third network device. The first network device is further configured to connect with the policy device, and send rules and policies associated with the level of quality of service to the policy device.

20 Claims, 6 Drawing Sheets

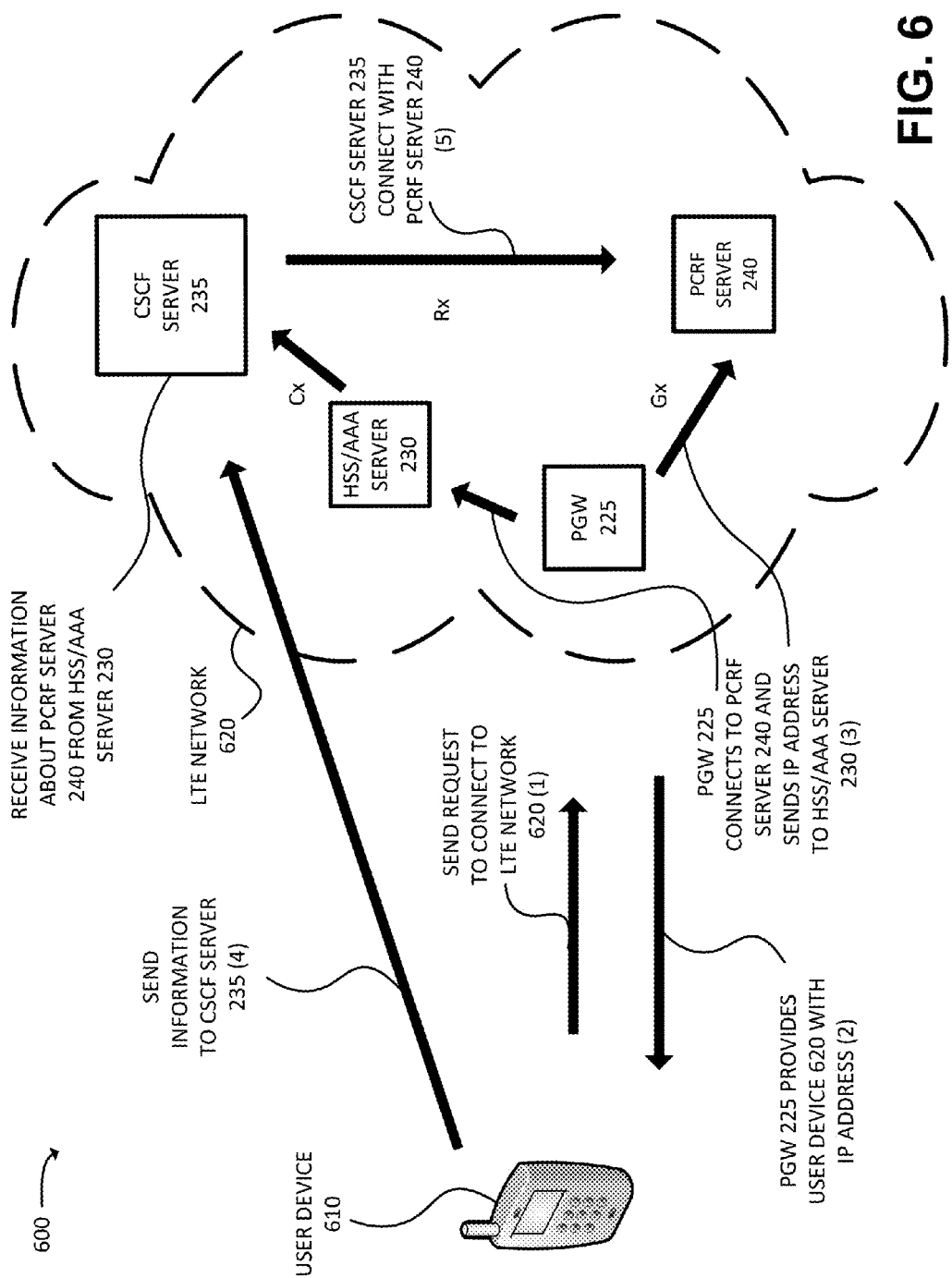

CONNECTING DEVICES TO A POLICY CHARGING RULES FUNCTION DEVICE

BACKGROUND

A user device may connect to a network to send/receive information to/from different sources. The network may have multiple network devices that are used to set up a communication path between the user device and a source. Some of the network devices may be used to determine rules and policies associated with providing a level of quality of service. Other network devices may be used to implement the rules and policies and apply the level of quality of service to the communication path between the user device and the source.

BRIEF DESCRIPTION OF DRAWINGS

FIG. 6 is a diagram of an example process for connecting network devices to a policy charging rules function server.

DETAILED DESCRIPTION OF PREFERRED EMBODIMENTS

The following detailed description refers to the accompanying drawings. The same reference numbers in different drawings may identify the same or similar elements.

Systems and/or methods described herein may cause both a packet data network gateway (hereinafter referred to as "PGW") and a call session control function server (hereinafter referred to as "CSCF server") to use the same policy charging and rules function server (hereinafter referred to as "PCRF server") during a session between a user device and a network. For example, when a user device connects to a network, the user device may be assigned to a particular PGW. The particular PGW may be connected to a PCRF server. The user device may also be assigned to a particular CSCF. The particular CSCF may receive information that may allow the particular CSCF to connect to the same PCRF server that is connected to the particular PGW.

Figure 1:
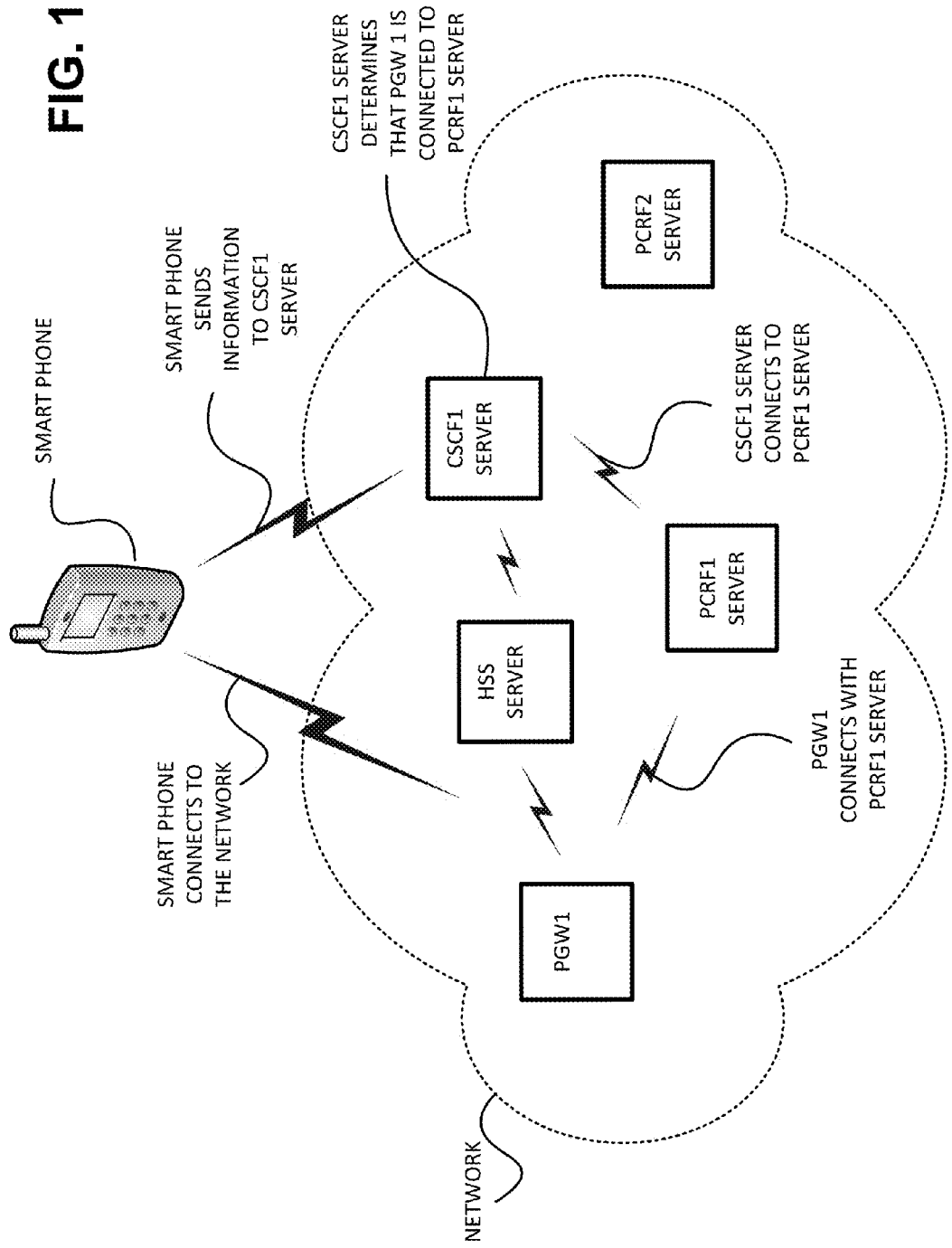
FIG. 1 is a diagram of an overview of an implementation described herein.

FIG. 1 is a diagram of an overview of an implementation described herein. FIG. 1 shows a smart phone, a network, PGW1, PCRF1 server, PCRF2 server, home subscriber server (HSS) server, and CSCF1 server. As shown in FIG. 1, the smart phone may connect to the network via PGW1. Upon connecting the smart phone to the network, PGW1 may connect to PCRF1 server. PGW1 may also send its identifier information to the HSS server. Assume that PGW 1 sends the information to the HSS server via another network device, such as a mobility management entity device (MME). CSCF1 server may receive identifier information regarding the smart phone from the smart phone, and CSCF1 server may also receive identifier information regarding PGW1 from the HSS server. CSCF1 server may determine, based on the identifier information regarding the smart phone, the type of communication being requested by the smart phone. CSCF1 server may determine, based on the identifier information regarding PGW1, that PCRF1 server (and not another PCRF server, such as PCRF2 server) is connected to PGW1. Thus, CSCF1 server may connect to the same PCRF server (PCRF1 server) that is connected to PGW1.

As a result, using the same PCRF server for the PGW and the CSCF server may allow for the level of QoS and/or other network policies, to be applied by the network. Using the same PCRF server for the PGW and the CSCF server may allow for the PCRF server to correlate a packet data network (PDN) session (associated with the PGW) with an Internet protocol multimedia system (IMS) session (associated with the CSCF server). This may allow for a user device to receive (from the network) the correct level of QoS and/or other network policies associated with a particular type of communication being sent to/from the user device.

Figure 2:
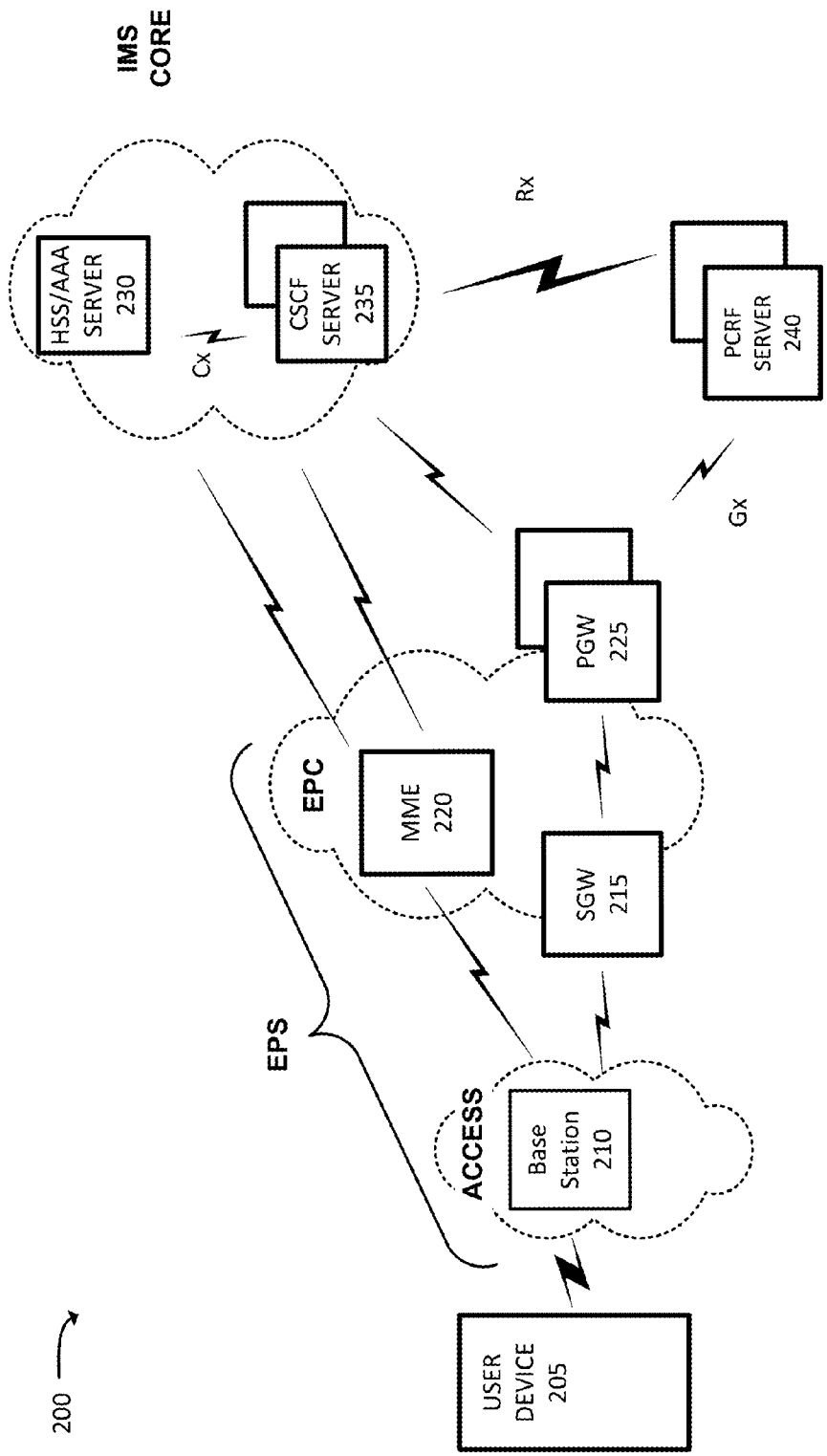
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 205, a base station 210, a serving gateway 215 (hereinafter referred to as "SGW 215"), a mobility management entity device 220 (hereinafter referred to as "MME 220"), multiple packet data network (PDN) gateways 225 (referred to generally as "PGWs 225" and individually as "PGW 225"), a home subscriber server (HSS)/authentication, authorization, accounting (AAA) server 230 (hereinafter referred to as "HSS/AAA server 230"), multiple call session control function (CSCF) servers 235 (referred to generally as "CSCF servers 235" and individually as "CSCF server 235"), and multiple policy charging and rules function servers 240 (referred to generally as 'PCRF servers 240" and individually as "PCRF server 240"). The quantity of devices and/or networks, illustrated in FIG. 2 is provided for explanatory purposes only. In practice, there may be additional devices and/or networks; fewer devices and/or networks; different devices and/or networks; and differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Environment 200 may include an evolved packet system (EPS) that includes an access network and/or an evolved packet core (EPC) that operate based on a third generation partnership project (3GPP) wireless communication standard. The access network may be a radio access network (RAN) that includes one or more base stations, such as eNodeBs (eNBs), via which user device 205 communicates with the EPC. The EPC may include SGW 215, MME 220, PGW 225, and/or PCRF server 240 that enables user device 205 to communicate with a network and/or an Internet protocol (IP) multimedia subsystem (IMS) core. The IMS core may include HSS/AAA server 230 and/or CSCF server 235 and may manage authentication, session initiation, account information, a user profile, etc. associated with user device 205. The IMS core may use Session Initiation Protocol (SIP) for establishing and managing media sessions over IP networks that allow IP multimedia services to be sent to user device 205. The combination of the access network, the EPC, and the IMS core may be defined as a long term evolution (LTE) network. The access network may include multiple base stations 210, and the EPC may include multiple SGWs 215, MMEs 220, PGWs 225, and/or PCRF servers 240. The IMS core may include multiple HSS/AAA servers 230 and/or CSCF servers 235.

As further shown in FIG. 2, PGW 225 may interface with PCRF server 240 over a Gx interface. CSCF server 235 may interface with PCRF server 240 over an Rx interface. HSS/AAA server 230 may interface with CSCF server 235 over a Cx interface. In one implementation, the Gx interface, the Rx interface, and/or the Cx interface may use the Diameter protocol. In another implementation, the Gx interface, the Rx interface, and/or the Cx interface may use a different protocol. These interfaces are provided merely as examples of interfaces that may be used.

User device 205 may include any computation or communication device, such as a wireless mobile communication device that is capable of communicating with a network (e.g., network 280). For example, user device 205 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a computer, a laptop, a tablet computer, a camera, a personal gaming system, a television, or another mobile, computation, or communication device.

User device 205 may include a variety of applications, such as, for example, an e-mail application, a telephone application, a camera application, a video application, a multi-media application, a music player application, a visual voicemail application, a contacts application, a data organizer application, a calendar application, an instant messaging application, a texting application, a web browsing application, a location-based application (e.g., a GPS-based application), a blogging application, and/or other types of applications (e.g., a word processing application, a spreadsheet application, etc.).

Base station 210 may include one or more network devices that receive, process, and/or transmit traffic, such as audio, video, text, and/or other data, destined for and/or received from user device 210. In an example implementation, base station 210 may be an eNB device and may be part of the LTE network. Base station 210 may receive traffic from and/or send traffic to other networks via SGW 215 and PGW 225. Base station 210 may send traffic to and/or receive traffic from user device 205 via an air interface. One or more of base stations 210 may be associated with a RAN, such as the LTE network.

SGW 215 may include one or more network devices, or other types of computation or communication devices, that gather, process, search, store, and/or provide information in a manner described herein. SGW 215 may include one or more data processing and/or traffic transfer devices, such as a gateway, a router, a modem, a switch, a firewall, a network interface card (NIC), a hub, a bridge, a proxy server, an optical add-drop multiplexer (OADM), or some other type of device that processes and/or transfers traffic. SGW 215 may, for example, aggregate traffic received from one or more base stations 210 and may send the aggregated traffic to other networks via PGW 225. In one example implementation, SGW 215 may route and forward user data packets, may act as a mobility anchor for a user plane during inter-base station handovers, and may act as an anchor for mobility between LTE and other 3GPP technologies.

MME 220 may include one or more network devices that gather, process, search, store, and/or provide information in a manner described herein. For example, MME 220 may perform operations associated with a handoff to and/or from the EPS. MME 220 may perform operations to register user device 205 with the EPS, to hand off user device 205 from the EPS to another network, to hand off a user device 205 from the other network to the EPS, and/or to perform other operations. MME 220 may perform policing operations for traffic destined for and/or received from user device 205.

PGW 225 may include one or more network devices that gather, process, search, store, and/or provide information in a manner described herein. PGW 225 may include one or more data processing and/or traffic transfer devices, such as a gateway, a router, a modem, a switch, a firewall, a NIC, a hub, a bridge, a proxy server, an OADM, or some other type of device that processes and/or transfers traffic. PGW 225 may, for example, provide connectivity of user device 205 to external packet data networks by being a traffic exit/entry point for user device 205. PGW 225 may perform policy enforcement, packet filtering, charging support, lawful intercept, and packet screening. PGW 225 may also act as an anchor for mobility between 3GPP and non-3GPP technologies. PGW 225 may authenticate user device 205 (e.g., via interaction with HSS/AAA server 230).

HSS/AAA server 230 may include one or more network devices, or other types of computation or communication devices, that gather, process, search, store, and/or provide information in a manner described herein. For example, HSS/AAA server 230 may manage, authenticate, update, and/or store, in a memory associated with HSS/AAA server 230, profile information associated with user device 205 that identifies applications and/or services that are permitted for and/or accessible by user device 205, bandwidth or data rate thresholds associated with the applications or services, information associated with a user of user device 205 (e.g., a username, a password, a personal identification number (PIN), etc.), rate information, minutes allowed, and/or other information. Additionally, or alternatively, HSS/AAA server 230 may include a device that performs authentication, authorization, and/or accounting (AAA) operations associated with a communication session with user device 205.

CSCF server 235 may include one or more network devices, or other types of computation or communication devices, that gather, process, search, store, and/or provide information in a manner described herein. In some implementations, CSCF server 235 may provide session information to PCRF server 240 so that PCRF server 240 may create policies and/or rules that are used to instruct PGW 225 regarding the level of QoS, or other network policies (e.g., amount of bandwidth) to be applied to a communication. In some implementations, CSCF server 235 may process and/or route calls to and from user device 210 via the EPC. For example, CSCF server 235 may process calls (received from other networks) that are destined for user device 205. In another example, CSCF server 235 may process calls, received from user device 205, that are destined for other networks.

PCRF server 240 may include one or more network devices, or other types of computation or communication devices, that gather, process, search, and/or provide information in a manner described herein. PCRF server 240 may also store subscriber information, such as voice call and data rate plans or quotas for subscribers. PCRF server 240 may provide network control regarding service data flow detection, gating, QoS, and/or flow-based charging. Policies and rules regarding QoS may include policies and rules instructing user device 210 and network elements (base station 210, SGW 215, MME 220, PGW 225, etc.) to minimize packet loss, to implement a packet delay budget, to provide a guaranteed bit rate (GBR), to provide low latency, and/or to perform other activities associated with QoS. PCRF server 240 may receive session information from CSCF server 235 and use the session information to provide policies and rules to other network devices, such as HSS/AAA server 230 and/or PGW 225, to implement network control. PCRF server 240 may determine how a certain service data flow shall be treated, and may ensure that user plane traffic mapping and QoS is in accordance with a user's profile and/or network policies.

In some implementations, user device 205 and other devices (associated with network 280) may have an address associated with an Internet protocol (IP) address. The IP address may be defined as an IP address associated with IP version 4 (IPv4), IP version 6 (IPv6), or any other IP version. In some implementations, user device 205 and other devices may be associated with session initiation protocol (SIP) data packets, and/or any other type of data packet.

Figure 3:
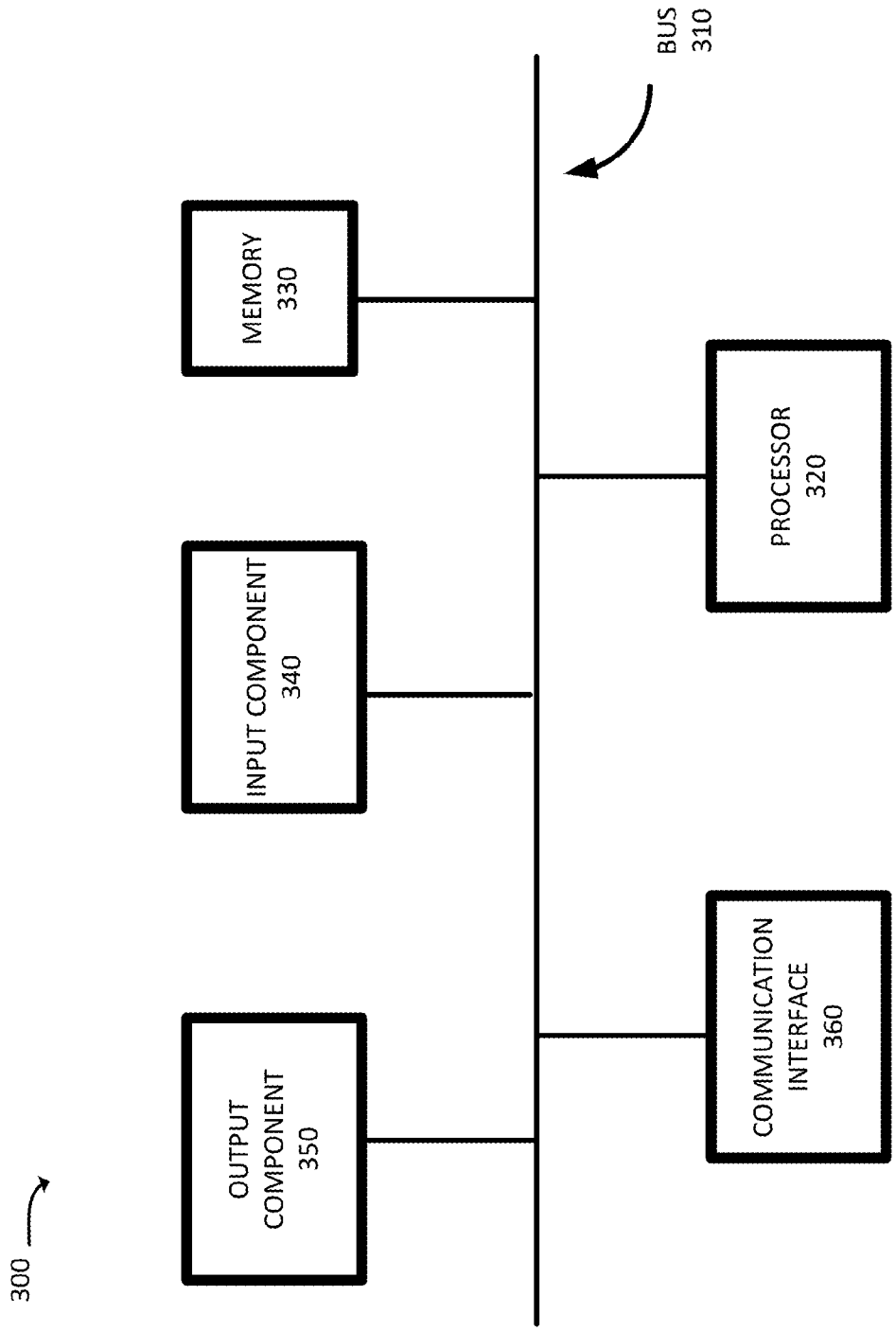
FIG. 3 is a diagram of example components of one or more devices of FIGS. 1-2.

FIG. 3 is a diagram of example components of a device 300. Device 300 may correspond to user device 205, base station 210, SGW 215, MME 220, PGW 225, HSS/AAA server 230, CSCF server 235, and PCRF server 240. Additionally, or alternatively, each of user device 205, base station 210, SGW 215, MME 220, PGW 225, HSS/AAA server 230, CSCF server 235, and/or PCRF server 240 may include one or more devices 300 and/or one or more components of device 300.

As shown in FIG. 3, device 300 may include a bus 310, a processor 320, a memory 330, an input component 340, an output component 350, and a communication interface 360. In other implementations, device 300 may contain fewer components, additional components, different components, or differently arranged components than depicted in FIG. 3. Additionally, or alternatively, one or more components of device 300 may perform one or more tasks described as being performed by one or more other components of device 300.

Bus 310 may include a path that permits communication among the components of device 300. Processor 320 may include one or more processors, microprocessors, or processing logic (e.g., a field programmable gate array (FPGA), or an application specific integrated circuit (ASIC)) that interprets and executes instructions. Memory 330 may include any type of dynamic storage device that stores information and instructions, for execution by processor 320, and/or any type of non-volatile storage device that stores information for use by processor 320.

Input component 340 may include a mechanism that permits a user to input information to device 300, such as a keyboard, a keypad, a button, a switch, etc. Output component 350 may include a mechanism that outputs information to the user, such as a display, a speaker, one or more light emitting diodes (LEDs), etc.

Communication interface 360 may include any transceiver-like mechanism that enables device 300 to communicate with other devices and/or systems. For example, communication interface 360 may include an Ethernet interface, an optical interface, a coaxial interface, a wireless interface, or the like.

In another implementation, communication interface 360 may include, for example, a transmitter that may convert baseband signals from processor 320 to radio frequency (RF) signals and/or a receiver that may convert RF signals to baseband signals. Alternatively, communication interface 360 may include a transceiver to perform functions of both a transmitter and a receiver of wireless communications (e.g., radio frequency, infrared, visual optics, etc.), wired communications (e.g., conductive wire, twisted pair cable, coaxial cable, transmission line, fiber optic cable, waveguide, etc.), or a combination of wireless and wired communications.

Communication interface 360 may connect to an antenna assembly (not shown in FIG. 3) for transmission and/or reception of the RF signals. The antenna assembly may include one or more antennas to transmit and/or receive RF signals over the air. The antenna assembly may, for example, receive RF signals from communication interface 360 and transmit the RF signals over the air, and receive RF signals over the air and provide the RF signals to communication interface 360. In one implementation, for example, communication interface 360 may communicate with other networks and/or devices connected to other networks.

As will be described in detail below, device 300 may perform certain operations. Device 300 may perform these operations in response to processor 320 executing software instructions (e.g., computer program(s)) contained in a computer-readable medium, such as memory 330, a secondary storage device (e.g., hard disk, CD-ROM, etc.), or other forms of RAM or ROM. A computer-readable medium may be defined as a non-transitory memory device. A memory device may include space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Figure 4:
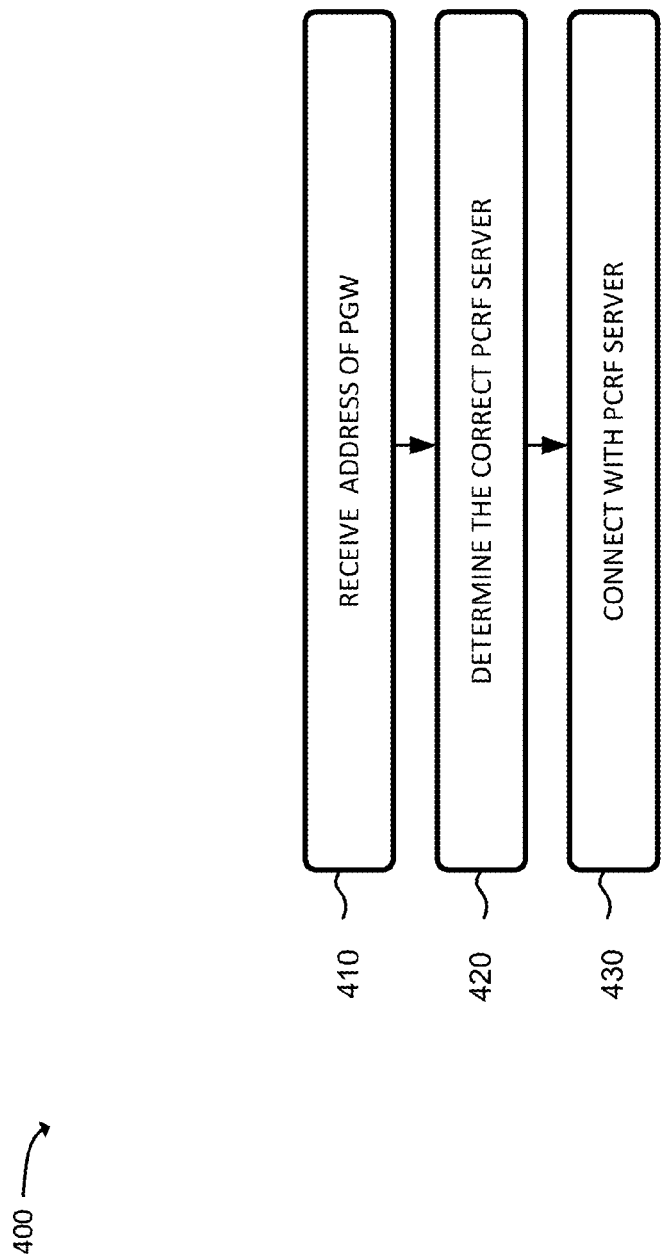
FIG. 4 is a flow chart of an example process for connecting network devices to a policy charging rules function server.

FIG. 4 is a flow chart of an example process 400 for connecting network devices to a PCRF server. In one implementation, process 400 may be performed by CSCF server 235. In another example implementation, one or more blocks of process 400 may be performed by one or more other devices, such as PGW 225 and/or PCRF server 240.

Process 400 may include receiving the address of a PGW (block 410). For example, CSCF server 235 may receive the IP address of PGW 225.

User device 205 may receive an IP address when user device 205 connects to the network. User device 205 may communicate with PGW 225 to receive the IP address. PGW 225 may send a message to user device 205 that includes an IP address assigned to user device 205. PGW 225 may obtain the IP address from an IP address pool. The IP address pool may be stored in PGW 225 or in another network device that can be accessed by PGW 225. User device 205 may receive the IP address from PGW 225 and may send the IP address to CSCF server 235. CSCF server 235 may receive the IP address for user device 205 and other information associated with user device 205. The IP address and the other information sent from user device 205 to CSCF server 235 may be sent within a SIP message. The other information may notify CSCF server 235 what type of communication is being requested by user device 205. For example, CSCF server 235 may be notified that user device 205 is being used to make a voice call with video capabilities. The type of communication may allow CSCF server 235 to determine the level of QoS to be applied to the communication.

PGW 225 may connect to a particular PCRF server 240 based on local configuration information. The local configuration information, for selecting a particular PCRF server 240, may be based on the PCRF server 240 being associated with the same part of the network (e.g., coverage area, cell area, an area associated with a distribution center) as PGW 225.

PGW 225 may have an IP address and/or identifier for PGW 225 and may send the IP address and/or identifier (for PGW 225) to HSS/AAA server 230. In some implementations, HSS/AAA server 230 may send the IP address and/or identifier (for PGW 225) to CSCF server 235 in a server authentication acknowledgement message ("SAA message")

over a Cx interface (e.g., Cx:SAA). Alternatively, HSS/AAA server 230 may send the IP address and/or identifier using another interface (e.g., such as an Rx interface).

Process 400 may include determining the correct PCRF server (block 420). For example, CSCF server 235 may determine, according to the IP address and/or identifier for PGW 225, to connect to a particular PCRF server 240 out of multiple PCRF servers 240 within the network. CSCF server 235 may have information that associates each PGW server 240 within a part of the network (or entire network) to a particular PCRF server 240. For example, one PGW 225 could be associated with a particular PCRF server 240 or multiple PGW 225 may be associated with a particular PCRF server 240. CSCF server 235 may analyze the IP address and/or identifier for PGW 225 received from HSS/AAA server 230, and may determine that the IP address for PGW 225 is associated with a particular PCRF server 240.

Process 400 may include connecting to the PCRF server (block 430). For example, CSCF server 235 may connect with PCRF server 240 based on associating the IP address and/or identifier for PGW 225 that is also connected with PCRF server 240. CSCF server 235 may connect whereas PGW 225 may connect to PCRF server 240 using a Gx interface. There may be one CSCF server 235 associated with a particular PCRF server 240, or there may be multiple CSCF servers 235 associated with a particular PCRF server 240. With CSCF server 235 and PGW 225 connected to the same PCRF server 240, the level of QoS and/or other network policies (e.g., amount of bandwidth) may be applied to the communications to/from user device 205. Thus, rules and policies sent from CSCF server 235 to PCRF server 240 may be sent by PCRF server 240 to the same PGW 225 that is connected to PCRF server 240.

PCRF server 240 may remain connected to CSCF server 235 and PGW 225 until the session, associated with user device 205, ends. The session may end, for example, because user device 205 is powered down, turned off, or the user, of user device 205, has stopped using user device 205 for a particular communication (e.g., the user has ended a phone call that was being made with user device 205).

Figure 5:
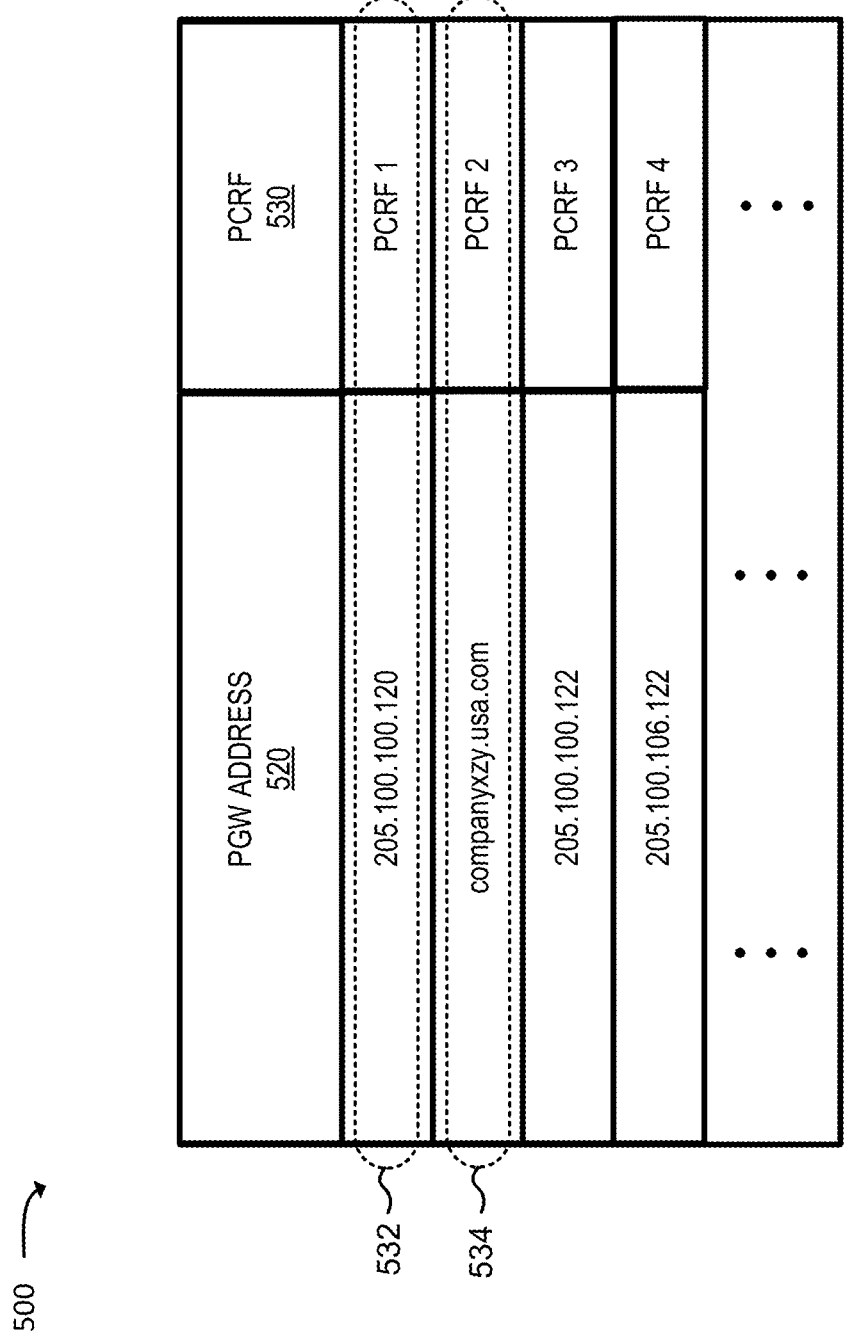
FIG. 5 is a diagram of an example data structure that stores network device information.

FIG. 5 is a diagram of an example data structure 500 that stores information used to determine to which PCRF server 240 to connect. In one example implementation, CSCF server 235 may store some or all of data structure 500. Additionally, or alternatively, PGW 225 may store some or all of data structure 500. Additionally, or alternatively, data structure 500 may be stored in memory, associated with another device or a group of devices, separate from or in combination with the memory associated with CSCF server 235 and/or PGW 225.

Data structure 500 may include a collection of fields, such as PGW address field 520, and PCRF 530 field. Although FIG. 5 shows example fields 520-530, in other implementations, data structure 500 may include fewer fields, different fields, additional fields, and/or differently arranged fields than depicted in FIG. 5. Additionally, or alternatively, one or more fields of data structure 500 may include information described as being included in one or more other fields of data structure 500.

PGW address field 520 may store an IP address or another type of address (e.g., fully qualified domain name (FQDN) such as mymail.place.com) for PGW 225. PGW address field 520 may store the IP addresses for multiple PGWs 225 within a network. As shown within ellipse 532 in the example of FIG. 5, PGW address field 520 may store an IP address of 205.100.100.120 and/or an FQDN such as companyxyz.usa-.com in ellipse 534.

PCRF field 530 may store identification information for PCRF server 240. CSCF server 235 may store the IP addresses for multiple PCRF servers 240 and may associate each PGW 225 (in the network) with the identification information for a particular PCRF server 240. As shown within ellipse 532 in the example of FIG. 5, PCRF field 530 may store an identifier of PCRF 1.

In one example implementation, CSCF server 235 may receive an IP address for PGW 225 (described with regard to block 410 in FIG. 4). CSCF server 235 may have information that associates each IP address for each PGW 225 with a particular PCRF server 240. CSCF server 235 may analyze the IP address for PGW 225 and determine that PGW 225 is associated with PCRF server 240. Further, CSCF server 235 may determine (described with regard to FIG. 4) that user device 205 is associated with a particular PGW 225 and PCRF server 240.

FIG. 6 is a diagram of an example process 600 for connecting network devices to a PCRF server. FIG. 6 shows PGW 225, HSS/AAA server 230, CSCF server 235, PCRF server 240, user device 610, and LTE network 620. Further, FIG. 6 shows a Gx interface between PGW 225 and PCRF server 240, an Rx interface between CSCF server 235 and PCRF server 240, and a Cx interface between HSS/AAA server 230 and CSCF server 235. An example of LTE network 620 may correspond to one or more devices (base station 220, SGW 230, MME 240, etc.) that make up the access network, the EPS, and/or the IMS core. An example of user device 610 may correspond to user device 205, described with regard to FIG. 2.

Assume that a user of user device 610 would like to connect to LTE network 620. Assume that the user is going to use user device 610 to make a voice call. Upon the user turning on user device 610, user device 610 may send a request to connect to LTE network 620 (identified by (1) in FIG. 6). The request is received by LTE network 620 and the request is sent to PGW 225. PGW 225 receives the request and assigns an IP address to user device 610 that allows user device 610 to communicate via LTE network 620. PGW 225 stores the IP address for user device 610 and sends the IP address to user device 610. PGW 225 sends the IP address to user device 610 via LTE network 620 (identified by (2) in FIG. 6). User device 610 receives the IP address. User device 610 may use the IP address as long as user device 610 is connected to LTE network 620.

PGW 225 may connect to PCRF server 240. PGW 225 may send its IP address to PCRF server 240 and PGW 225 may also send its IP address to HSS/AAA server 230 (identified by (3) in FIG. 6). Assume that PGW 225 sends its IP address to HSS/AAA server 230 via MME 220. HSS/AAA server 230 may send the IP address for PGW 225 to CSCF server 235. HSS/AAA server 230 may send the IP address for PGW 225 over a Cx interface within a Cx:SAA message. Additionally, user device 610 may information regarding the type of communication to CSCF server 235 (identified by (4) in FIG. 6).

CSCF server 235 may use the IP address of PGW 225 to determine that PGW 225 is connected to PCRF server 240. CSCF server 235 may store relationships (e.g., a data structure described with regard to FIG. 5) between different PCRF servers 240 and different PGWs 225. Thus, CSCF server 235 find the PCRF server 240 connected to PGW 225 and CSCF server 235 may connect with PCRF server 240 (identified by (5) in FIG. 6).

Communications (2), (3), and (4), described with regard to FIG. 6, may occur at different times or may occur at the same time.

With the CSCF server 235 connected to PCRF server 240, CSCF server 235 may send the rules and policies associated with the particular type of communication (such as a voice call) to PCRF server 240. PCRF server 240 may receive the rules and policies and send notifications to PGW 225 to implement the rules and policies as provided by CSCF server 235.

As a result, using the same PCRF server for the PGW and the CSCF server may allow for the level of QoS and/or other network policies, associated with a communication, to be implemented by the network. This may allow for a user device to receive the level of QoS associated with a particular type of communication.

The foregoing description of implementations provides illustration and description, but is not intended to be exhaustive or to limit the implementations to the precise form disclosed. Modifications and variations are possible in light of the above disclosure or may be acquired from practice of the implementations.

While a series of blocks has been described with regard to FIG. 4, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A first network device comprising: a communication interface; a memory; and one or more processors, connected to the memory and the communication interface, to: receive a first message from a user device via the communication interface, the first message including an identifier for the user device and identifying a type of information being requested by the user device; determine a level of quality of service to be applied by a network based on the type of information being requested by the user device; receive a second message from an authentication, authorization, accounting (AAA) server, the second message including an identifier for a packet data network gateway (PGW), the PGW being connected to a policy device; determine, based on receiving the identifier for the PGW, the policy device connected to the PGW out of a plurality of policy devices included in the network; connect, based on determining the policy device connected to the PGW, with the policy device via the communication interface; and send, via the communication interface and based on connecting with the policy device, rules and policies associated with the level of quality of service to the policy device, the first network device being a call session control function (CSCF) server.

2. The first network device of claim 1, where, when determining the policy device connected to the PGW, the one or more processors are to:
determine a relationship, stored by the first network device, between the policy device and PGW.

3. The first network device of claim 1, where, when connecting with the policy device, the one or more processors are to:
connect to the policy device using an Rx interface,
the PGW connects to the policy device using a Gx interface.

4. The first network device of claim 1, where, when sending the rules and policies associated with the level of quality of service to the policy device, the one or more processors are to:
send the rules and policies based on the type of information being requested by the user device.

5. The first network device of claim 1, where the one or more processors are further to:
terminate the connection with the policy device.

6. The first network device of claim 1, where the first message is a Session Internet Protocol message.

7. The first network device of claim 1, where, when receiving the second message, the one or more processors are to:
receive the second message, including the identifier for the PGW, from the AAA server using a Cx interface, the second message being a server authorization authentication message.

8. The first network device of claim 1, where the one or more processors are further to:
store association information that associates each of a plurality of PGWs in the network, including the PGW, to a particular policy device of the plurality of policy devices; and
where the one or more processors, when determining the policy device connected to the PGW, are to:
determine the policy device based on the association information and the identifier for the PGW included in the second message.

9. A method comprising: receiving, by a first network device, a first message from a user device via a communication interface included in the first network, the first message including an identifier for the user device and identifying a type of information being requested by the user device; determining, by the first network device, a level of quality of service to be applied by a network based on the type of information being requested by the user device; receiving, by the first network device and via the communication interface, a second message from an authentication, authorization, accounting (AAA) server, the second message includes an identifier for a packet data network gateway (PGW), the PGW being connected to a policy device; determining, by the first network device and based on receiving the identifier for the PGW, the policy device connected to the PGW out of a plurality of policy devices included in the network; connecting, by the first network device and based on determining the policy device connected to the PGW, with the policy device and via the communication interface; and sending via the communication interface and, based on connecting with the policy device, rules and policies associated with the level of quality of service to the policy device, the policy device instructing one or more network devices, in the network, based on the rules and policies, and the first network device being a call session control function (CSCF) server.

10. The method of claim 9, where the level of quality of service includes a factor regarding a packet delay budget, a latency level, or a bit error rate level.

11. The method of claim 9, where the first network device and the AAA server are part of an Internet protocol multimedia system core, and where the PGW is part of an evolved packet core.

12. The method of claim 9, where the first network device connects to the PGW using an Rx interface.

13. The method of claim 9, where the AAA server connects to the PGW using a Gx interface.

14. The method of claim 9, where receiving the second message includes: receiving the second message, including the identifier for the PGW, from the AAA server over a Cx interface.

15. The method of claim 9, where the second message is a server authorization authentication message.

16. A non-transitory computer-readable medium comprising: a plurality of instructions, that when executed by one or more processors of a first network device of a call session control function (CSCF) server, cause the one or more processors to: receive a first message from a user device via a communication interface included in the first network, the first message including an identifier for the user device and identifying a type of information being requested by the user device for a particular session with a network; determine a level of quality of service to be applied by the network based on the type of information being requested by the user device, the level of quality of service associated with the type of information being requested by the user device; receive a second message from an authentication, authorization, accounting (AAA) server via the communication interface, the second message including an identifier for a packet data network gateway (PGW), the PGW being connected to a policy device; determine, based on receiving the identifier for the PGW, the policy device connected to the PGW out of a plurality of policy devices included in the network; connect, based on determining the policy device connected to the PGW, with the policy device via the communication interface; and send via the communication interface and, based on connecting with the policy device, rules and policies to the policy device.

17. The non-transitory computer-readable medium of claim 16, where one or more instructions, of the plurality of instructions, to receive the second message include one or more instructions to: receive the second message, including the identifier for the PGW, from the AAA server over a Cx interface.

18. The non-transitory computer-readable medium of claim 16, where the plurality of instructions, when executed by the one or more processors, further cause the one or more processors to:
disconnect from the policy device when the user device is disconnected from the network.

19. The non-transitory computer-readable medium of claim 16, where one or more instructions, of the plurality of instructions, to connect with the policy device include one or more instructions to:
connect to the policy device over an Rx interface,
the PGW connecting to the policy device over a Gx interface.

20. The non-transitory computer-readable medium of claim 16, where one or more instructions, of the plurality of instructions, to send the rules and policies to the policy device include one or more instructions to:
send rules and policies associated with the type of information being requested by the user device.

* * * * *